Aug. 9, 1960 — C. E. FIFAREK — 2,948,315
SAW TOOTH SHIELD
Filed Aug. 19, 1957
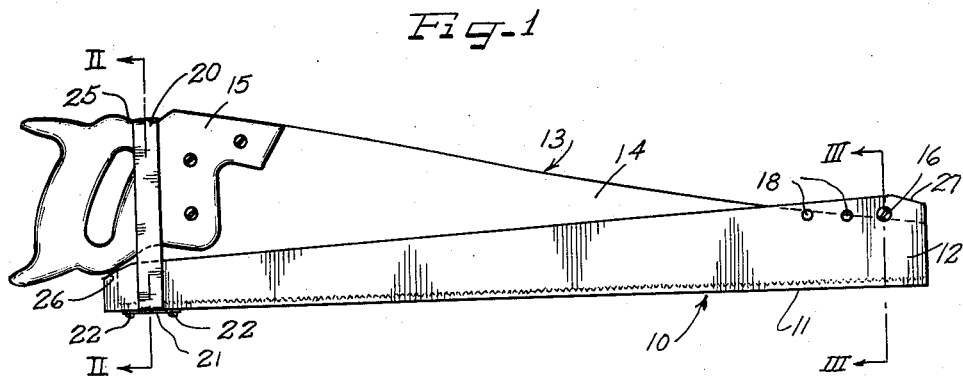
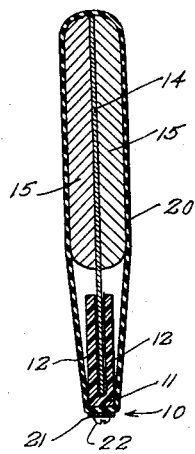
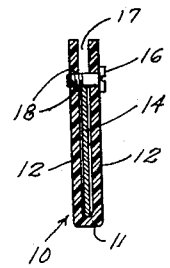
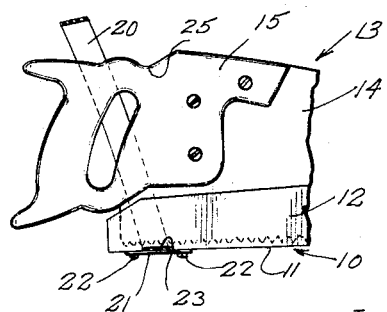
Inventor
Charles E. Fifarek _United States Patent Office_

2,948,315
Patented Aug. 9, 1960

2,948,315

SAW TOOTH SHIELD

Charles E. Fifarek, 2211 Atlantic St., Melrose Park, Ill.

Filed Aug. 19, 1957, Ser. No. 679,042

1 Claim. (Cl. 145—35)

This invention relates to a protection guard or shield for a hand saw such as a carpenter saw, and more particularly to a guard that can adjustably and readily receive different sizes and shapes of saws.

An object of this invention is to provide a very simple form of saw blade guard which can quickly and easily be applied to different sizes and shapes of saws.

Another object of this invention is to provide a protection guard for a saw with means for holding the saw in the guard other than solid springs and the like which are readily subject to damage and require careful handling in their application to a saw.

Another object of this invention is to provide such a simple guard for a hand saw that the average craftsman or carpenter can quickly apply the guard to the saw without having to do anything more than stretch a rubber band in order to effect securement of the guard and saw in assembled relation.

In accordance with the general features of this invention, there is provided a protective guard for a saw, having at least a handle and a toothed blade, comprising a shield having opposite generally parallel spaced legs of a length and height to receive therebetween and encase the toothed edge portion of the saw blade, and a resilient, rubber-like band fastened to one end of the shield and extending transversely around and over the end, the band including a loop bridging the space between the legs of the shield and resiliently stretchable for engagement over the handle of a saw in the guard, and the shield having abutment means at the other end of the guard for engaging the other end of the saw blade remote from the handle when the blade is in the shield.

Another feature of the invention relates to the fastening for the rubber band in the aforesaid guard and which fastening comprises a simple metal clip for detachably anchoring the band to the base of a shield in such manner that the band can be quickly and easily replaced upon wearing out or losing its elasticity.

Still another feature of the invention relates to the abutment means of the aforesaid guard being in the form of a simple stud like element bridgnig the gap between the legs of the shield or guard and adjustably securable in any one of a series of holes in one of the guard legs to accommodate different sizes or shapes of saw blades.

Other objectives and features of this invention will more fully appear from the following detailed description taken in connection with the accompanying drawings which illustrate a single embodiment and in which:

Figure 1 is a side elevation of the guard showing a hand saw secured in place therein;

Figure 2 is an enlarged cross-sectional view taken on substantially the lines II—II of Figure 1, looking in the direction of the arrows and showing the cooperation of the rubber band with the saw and shield;

Figure 3 is a cross-sectional view taken on the lines III—III of Figure 1 looking in the direction indicated by the arrows and showing how the other or free end of the saw is in abutment with an adjustable stud or screw; and Figure 4 is a fragmentary side view corresponding to the left or handle end of Figure 1, partly in section, showing how the stretchable loop-like rubber band is secured to the base of the shield.

As shown on the drawings:

The reference character 10 designates generally the shield of my novel protection guard and which shield may be made of any suitable material such as wood, plastic or hard rubber. The shield includes a base 11 and upstanding, opposite spaced parallel legs 12—12.

The guard or shield 10 is adapted to protect a hand saw designated generally by the reference character 13, and more particularly the blade portion 14 of the saw which includes the usual or conventional wood handle 15.

The spaced legs 12—12 of the shield are spaced apart a distance sufficient to snugly receive therebetween the toothed blade 14 as best shown in Figure 3. Also, the legs are of sufficient height and length to encase substantially the lower toothed portion of the saw blade 14 when the saw is in the guard. The end of the guard remote from the saw handle 15 is provided with an adjustable screw or stud 16 extending transversely of the gap 17 (Figure 3) for engagement with a top edge of the saw blade 14. This screw or stud 16 can be adjustably secured in any one of sets of holes 18—18—18 in the legs 12 of the shield.

In the embodiment illustrated, the legs are provided with a series of three sets of such holes 18 each set of which comprises aligned holes in the opposite legs 12—12 so that the screw 16 may be inserted through one leg and threaded into the other.

Now it will be appreciated by virtue of the longitudinal spacing of the sets of holes 18, that the stud 16 can be inserted at different points for engagement with the top edge of the blade depending upon the size or shape of the blade. In this way a very simple form of stop or abutment means is provided for preventing longitudinal displacement of the saw in the holder in a direction away from the handle 15.

At the other end of the guard or shield, I provide a very simple, inexpensive and foolproof means for holding the handle end of the saw in the recess or gap of the shield and down against its bottom 11. This means comprises a continuous resilient, rubber-like band 20 extending transversely of the shield and saw assembly and having its lower end fastened to the bottom 11 of the shield. A quickly removable fastening is employed for this purpose which takes the form of a metal plate or clip 21 attached to the bottom 11 by spaced screws 22—22.

As shown in Figure 4, the bottom 11 of the shield, is recessed at 23 to an extent sufficient to receive in said recess the lower end of the rubber-like band 20 so that such end is substantially flush with the outer surface of the bottom 11. It will be apparent that upon breakage of the rubber band or upon its losing its elasticity, it may be quickly and easily replaced by simply removing the plate 21.

Further it is apparent that by virtue of the yieldable and soft characteristics of the band 20, as distinguished from the solidness of a spring or other attaching means, it will not in any way damage the saw or its teeth. In addition, the loop or upper end of the band 20 is easily and readily stretchable for application over the saw handle 15. Upon contraction, the band will engage in the usual depression 25 in the wooden handle 15, as best shown in Figures 1 and 4.

In applying the saw to the guard, the blade is inserted between the legs 12 of the guard and is pushed forward until the top edge of its free end abuts the stud 16. Thereafter, the rubber band 20 is stretched and applied over the handle from the position shown in Figure 4 to the retaining position shown in Figure 1.

It will also be noted that the ends of the shield legs 12—12 are slightly beveled as indicated at 26 and 27. The bevel 26 affords clearance for the saw handle 15 to be brought into close proximity with the shield so that the toothed edge of the blade can firmly rest on the bottom 11 of the shield.

Once the saw 13 is in the guard 10, its teeth are fully protected and even though the assembly may be dropped, the teeth will not be damaged as the rubber band 20 resiliently holds the saw in the guard and against the abutment stud 16.

It will be understood that modifications and variations may be effected without departing from the scope of the novel concepts of the present invention.

I claim:

A protection guard for a saw, having at least a toothed blade and a handle with a depression in its top edge, comprising a shield having opposite generally parallel spaced legs of a length and height to receive therebetween and encase the toothed edge portion of the saw blade, means at one end of the shield to engage over a top edge of the free end of the saw blade to hold down said end in said shield, said means comprising a stud like element bridging the gap between said legs of the shield and being adjustably securable in any one of a series of holes in one of said guard legs to accommodate different sizes and shapes of saw blades, and a resilient rubber-like band extending transversely of the other and opposite end of said shield, said band being fastened at one end to said shield and having a resilient loop at its other end transversely of and above the gap between said shield legs and being resiliently stretchable upwardly away from said shield to engage over the top of the saw handle, said loop being of a width to fit in said handle depression to hold detachably the handle end of the blade in said shield and to assist in resisting longitudinal shifting of the blade out of engagement with said stud.

References Cited in the file of this patent

UNITED STATES PATENTS

| | | |
|---|---|---|
| 308,942 | Yewell | Dec. 9, 1884 |
| 1,593,935 | Gerick et al. | July 27, 1926 |
| 2,181,779 | Barnard | Nov. 28, 1939 |
| 2,792,038 | Riccitelli | May 14, 1957 |

FOREIGN PATENTS

| | | |
|---|---|---|
| 113,470 | Sweden | Mar. 13, 1945 |
| 776,867 | France | Nov. 17, 1934 |